United States Patent [19]
Zayat, Jr.

[11] Patent Number: 5,845,413
[45] Date of Patent: Dec. 8, 1998

[54] NOTE PAD HOLDER FOR A TAPE MEASURE

[76] Inventor: Charles D. Zayat, Jr., 100 New Hampshire St., Cranston, R.I. 02920

[21] Appl. No.: 986,698

[22] Filed: Dec. 8, 1997

[51] Int. Cl.⁶ .................................................. G01B 3/10
[52] U.S. Cl. ............................................... 33/760; 33/770
[58] Field of Search ............................ 33/760, 759, 761, 33/770, 755

[56] References Cited

U.S. PATENT DOCUMENTS

| | | | |
|---|---|---|---|
| 3,838,520 | 10/1974 | Quenot | 33/760 |
| 4,766,673 | 8/1988 | Bolson | 33/760 |
| 4,786,010 | 11/1988 | Dynan | 33/760 |
| 5,079,851 | 1/1992 | Sill | 33/760 |
| 5,257,729 | 11/1993 | Silvernail | 33/760 |
| 5,430,952 | 7/1995 | Betts | 33/760 |
| 5,459,942 | 10/1995 | Hintz, Jr. | 33/760 |
| 5,575,506 | 11/1996 | Gardenhour, Jr. et al. | 33/760 |

Primary Examiner—Christopher W. Fulton
Attorney, Agent, or Firm—Barlow, Josephs & Holmes, Ltd.

[57] ABSTRACT

A note pad holder is secured to a tape measure of the type including a box-shaped housing having a planar front wall, a planar back wall which is parallel to and spaced from the front wall, a top wall, a bottom wall, and a pair of end walls. A tape reel is provided within the housing for dispensing tape through a horizontal aperture formed in one of the end walls. The note pad holder includes a flexible sleeve sized to fit snugly over the front, back, top and bottom walls of the housing of the tape measure. The note pad holder further includes a pocket formed on the sleeve in a position in which it is adjacent one of the front and back walls. The pocket is sized for receiving therein a note pad. Other embodiments of the note pad holder are further contemplated.

15 Claims, 5 Drawing Sheets

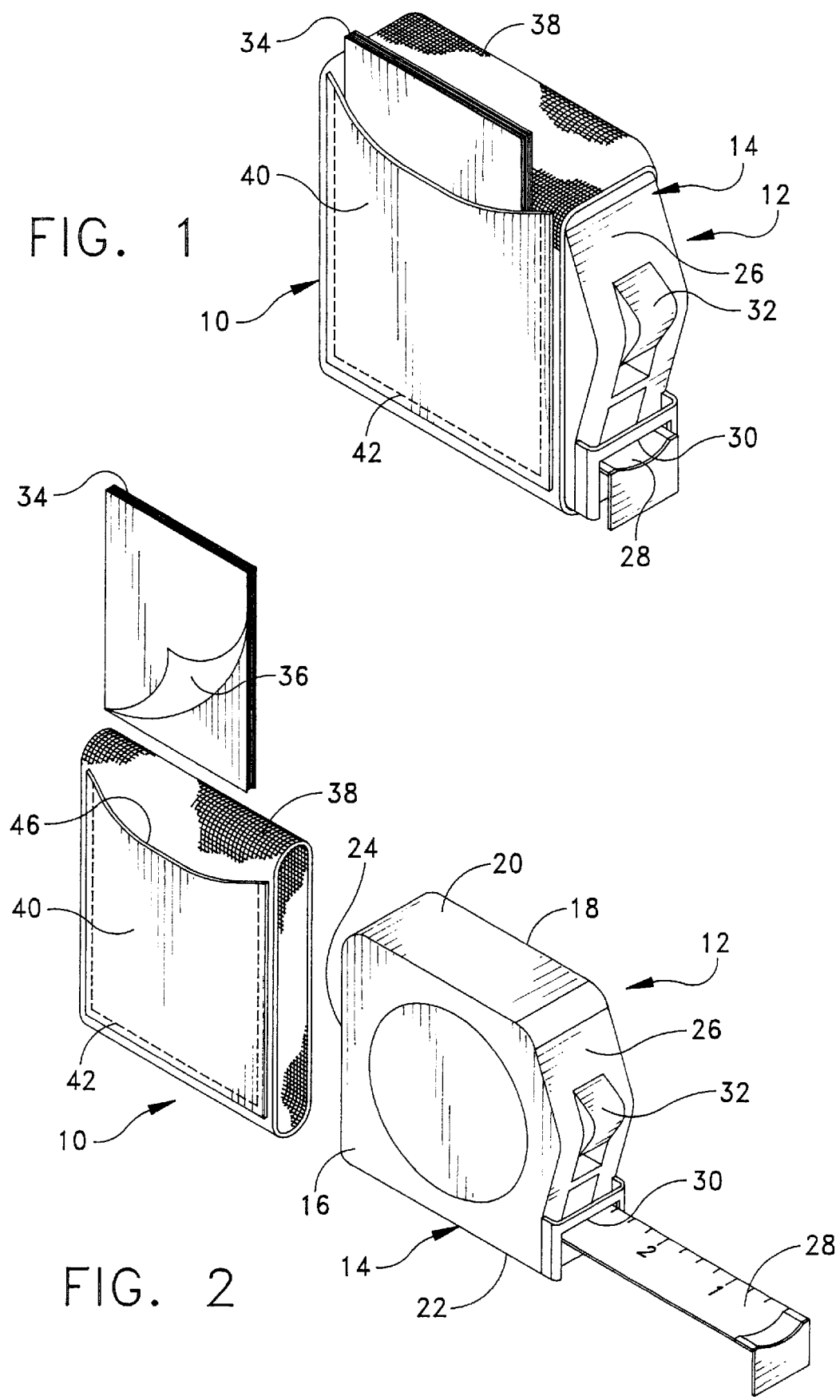

NOTE PAD HOLDER FOR A TAPE MEASURE

BACKGROUND OF THE INVENTION

This invention relates generally to note pads and note pad holders, and more particularly to a note pad holder which is releasably attachable to a standard tape measure.

Oftentimes it is desirable when using a tape measure to take notes pertinent to the items being measured, e.g., dimensions. During such instances, it is sometimes difficult to find a note pad or suitable writing material to jot down the notes.

Reference can be made to U.S. Pat. Nos. 5,430,952 to Betts and 5,575,506 to Gardenhour, Jr. et al. for devices which attempt to overcome this problem. The Betts patent discloses a tape measure having housing and a plastic pocket formed on the back surface of the housing. The pocket is sized to receive therein a pad of paper used for note taking. A problem associated with the tape measure disclosed by Betts is that it is expensive to fabricate the pocket on the housing. Stated another way, the tape measure housing is expensive to make since it requires customizing in creating the pocket thereon.

Gardenhour, Jr. et al. disclose a writing pad which is secured to a clip of a standard tape measure. Specifically, the writing pad is made from a substantially rigid material having a writing surface and an opening for receiving the clip of the tape measure therein. As illustrated in FIGS. 1 and 3 of Gardenhour Jr. et al., the writing pad is awkwardly positioned on the tape measure and appears to interfere with its use. In addition, the writing pad must be erased prior to each use which, under certain circumstances, is inconvenient.

The foregoing illustrates limitations known to exist in present note pad holders for tape measures. Thus, it is apparent that it would be advantageous to provide an improved note pad holder directed to overcoming one or more of the limitations set forth above. Accordingly, a suitable alternative is provided including features more fully disclosed hereinafter.

SUMMARY OF THE INVENTION

In general, the present invention is directed to a note pad holder for a tape measure comprising a box-shaped housing having a planar front wall, a planar back wall which is parallel to and spaced from the front wall, a top wall, a bottom wall, and a pair of end walls. The top, bottom and end walls are narrow in width with respect to the front and back walls. A tape reel is provided within the housing for dispensing tape through a horizontal aperture formed in one of the end walls. The note pad holder comprises a flexible sleeve sized to fit snugly over the front, back, top and bottom walls of the housing of the tape measure. The note pad holder further comprises a pocket formed on the sleeve in a position in which it is adjacent one of the front and back walls. The pocket is sized for receiving therein a note pad.

Specifically, the sleeve is fabricated from elastic fabric material which is stretched over the housing of the tape measure. The pocket is preferably fabricated from a rectangularly-shaped sheet of material attached on three sides thereof to the sleeve when the sleeve is in a relaxed condition. The non-attached side defines a mouth through which a note pad is deposited within the pocket.

In a second aspect of the invention, holding means is formed on the sleeve for receiving a note pad and for securing the note pad to the sleeve in a position in which it is adjacent one of the front and back walls. The holding means comprises a rectangularly-shaped sheet of material attached on all four sides thereof to the sleeve. In this embodiment, the sheet of material has an elongate slit formed therein sized for receiving a note pad.

In a third aspect of the invention, the holding means comprises a rigid plate including a rectangularly-shaped body having a pair of elongate slots formed along opposite edges of the body in such a manner that the slots are parallel to the opposite edges. The sleeve is woven through the elongate slots for securing the plate to the sleeve. The body of the plate further has a large opening formed therein, the large opening being positioned between the elongate slots for exposing a writing surface of the note pad.

Accordingly, among the several objects of the present invention are: the provision of a note pad holder for a tape measure capable of securing a note pad thereto; the provision of such an improved note pad holder which locates the note pad conveniently on the tape measure; the provision of such an improved note pad holder which is simple in design and easy to use; and the provision of such an improved note pad holder which is cost-efficient to manufacture and sell.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention:

FIG. 1 is a front perspective view of a note pad holder of the present invention secured to a tape measure of standard construction;

FIG. 2 is a perspective view illustrating the note pad holder prior to its securement to the tape measure and a note pad prior to its insertion into a pocket of the note pad holder;

Corresponding reference numerals designate corresponding parts throughout the several views of the drawings.

DETAILED DESCRIPTION OF THE PREFERRED EMBODIMENTS

Figure 3:
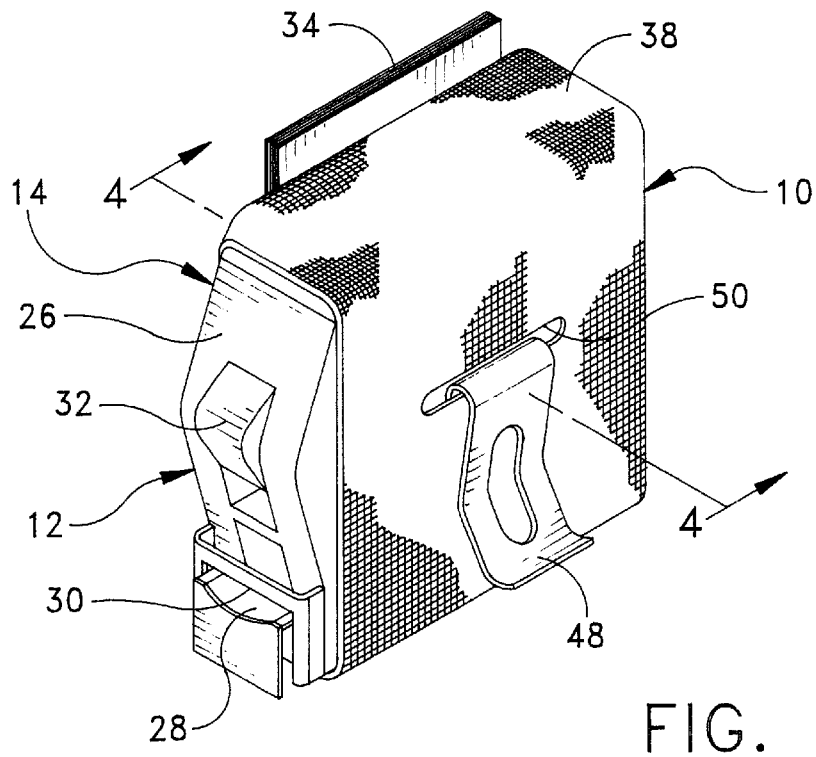
FIG. 3 is a rear perspective view of the note pad holder and the tape measure illustrated in FIG. 1.

Referring to the drawings, and to FIGS. 1–4 in particular, there is generally indicated at 10 a note pad holder of the present invention which is especially suited for use with a standard tape measure, generally indicated at 12. As most clearly shown in FIGS. 2 and 4, the tape measure 12 is of standard construction, it having a box-shaped housing generally indicated at 14 defined by a planar front wall 16, a planar back wall 18 which is parallel to and spaced from the front wall 16, a top wall 20, a bottom wall 22, and a pair of end walls 24, 26. The top wall 20, the bottom wall 22, and end walls 24, 26 are narrow in width as compared to the relatively large front and back walls 16, 18. Typically, the housing 14 is fabricated from rigid material, such as stainless steel or rigid plastic.

Referring specifically to FIGS. 1 and 2, the tape measure 12 further includes a tape reel (not shown) disposed within the housing 14 in the conventional manner. The tape reel dispenses tape 28 through a thin aperture 30 formed at the bottom of the end wall 26. The tape reel is constructed in such a manner that tape 28 pulled from the housing 14 of the tape measure 12 is retracted back into the housing 12 by a spring force. A sliding lock mechanism 32 is provided for locking the tape 28 in place so that the spring force on the tape reel does not recoil the tape 28. This construction is well known in the art of tape measures.

The note pad holder 10 of the present invention illustrated in FIGS. 1–4 is constructed for securing a note pad 34 thereto in a releasable manner. As shown in FIG. 2, the note pad 34 is of the type having a plurality of removable, self-stick notes 36. However, it should be understood that any type of note pad sized to be held by the note pad holder 10 is sufficient. The note pad holder 10 comprises a flexible, closed loop sleeve 38 which is sized to fit snugly over the front, back, top and bottom walls 16, 18, 20, and 22 of the housing 14 of the tape measure 12.

Figure 4:
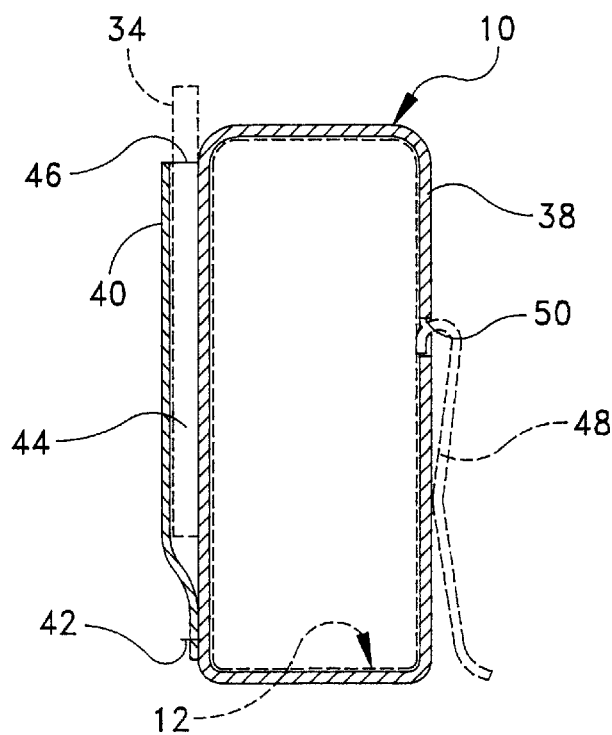
FIG. 4 is a cross-sectional view of the note pad holder taken along Line 4—4 of FIG. 3, the tape measure and note pad being illustrated in broken lines.

Preferably, the sleeve 38 is constructed from elastic fabric material which can be easily stretched over the housing 14 of the tape measure 12 (see FIG. 4). As shown in FIG. 2, the interior space defined by the closed loop sleeve 38 is smaller than the height and width dimensions of the housing 14 of the tape measure 12. The sleeve 38 is secured to the housing 14 by stretching the sleeve 38 outwardly and slipping it over the housing 14. The sleeve 38 has a width so that the aforementioned walls (i.e., walls 16, 18, 20, and 22) of the housing 14 surrounded by the sleeve 38 are substantially covered. The width of the sleeve 38 ensures a tight securement of the sleeve 38 over the housing 14, and assists in preventing the sleeve 38 from slipping off the housing 14 during use.

Still referring to FIGS. 1–4, a rectangularly-shaped sheet of material 40, e.g., cloth, leather, or simulated leather, is secured to the sleeve 38 on three sides of the sheet 40. Preferably, the sheet 40 is secured to the sleeve 38 by stitching 42; however, any other suitable method can be used. The space between the sheet 40 and the sleeve 38 defines a pocket 44 (see FIG. 4) for receiving the note pad 34 therein. As shown, the pocket 44 is disposed over the front wall 16 of the housing 14 of the tape measure 12. Specifically, the non-attached side of the sheet 40 defines a mouth 46 through which the note pad 34 is deposited within the pocket 44. FIG. 2 illustrates the note pad 34 prior to its insertion within the mouth 46 of the pocket 44. Preferably, the mouth 46 is formed adjacent the top wall 20 of the housing 14 so that it is conveniently located for removing the note pad 34 from the note pad holder 10.

It should be understood that the pocket 44 and the sleeve 38 can be integrally formed from two ply sheet material and still fall within the scope of the present invention.

Turning now to FIGS. 3 and 4, the tape measure 12 is shown to include a spring clip 48 mounted on the back wall 18 of the housing 14. This spring clip 48 is provided for attaching the tape measure 12 on a belt (not shown), for example, and is constructed in the well known manner. For ensuring that the spring clip 38 is revealed after applying the sleeve 38 of the note pad holder 10 thereon, an elongate slit 50 is formed in the sleeve 38, this slit 50 being sized for receiving the spring clip 48 therethrough as illustrated in FIGS. 3 and 4. In order to properly secure the sleeve 38 onto the housing 14 of the tape measure 12, the sleeve 38 must be manipulated to insert the spring clip 48 through the slit 50 and rotated slightly so that the entire spring clip 48 protrudes through the sleeve 38. Once properly fitted, the note pad holder 10 of the present invention does not detract from the utility provided by the spring clip 48 of the tape measure 12.

It should be noted that the pocket 44 of the note pad holder 10 can have a window (not shown) formed therein for allowing a person to take notes on the note pad 34 without removing it from the note pad holder 10. This feature is disclosed in a preferred embodiment discussed below.

Figure 5:
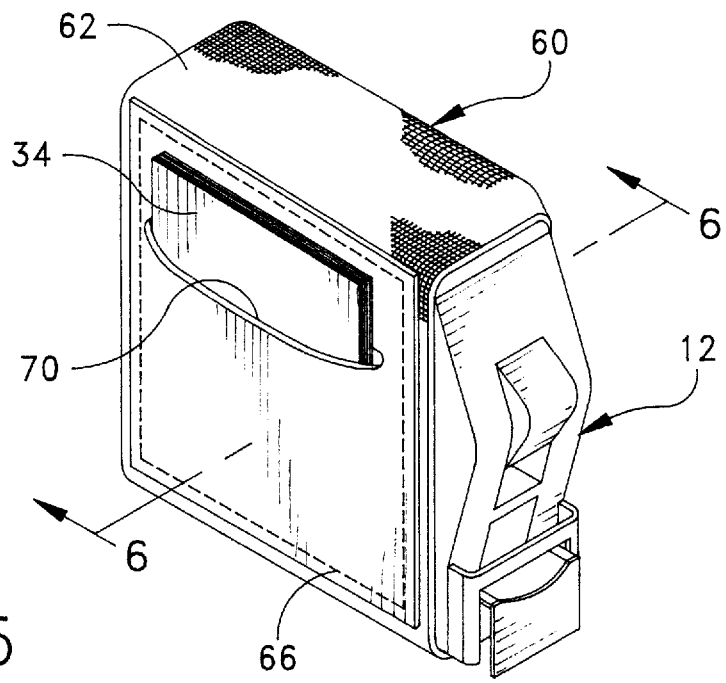
FIG. 5 is a perspective view of a note pad holder of another preferred embodiment secured to the tape measure.
Figure 6:
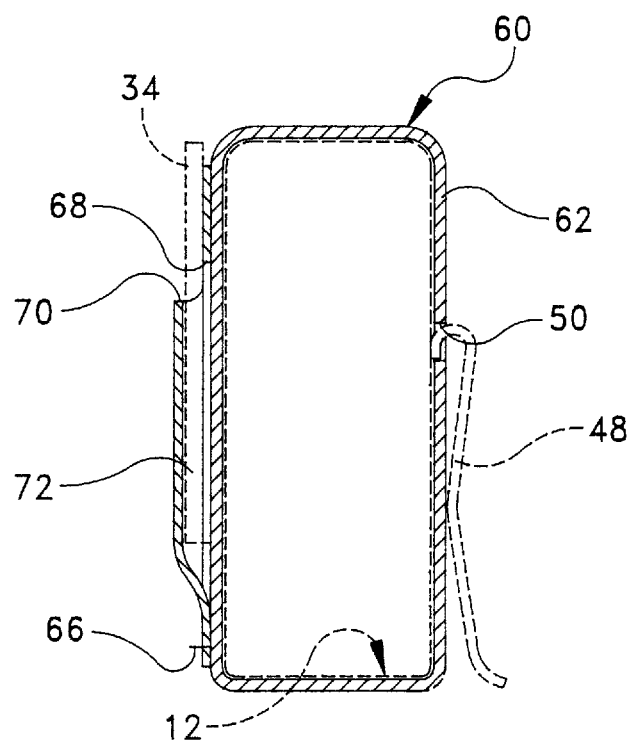
FIG. 6 is a cross-sectional view of the note pad holder illustrated in FIG. 5 taken along Line 6—6 thereof, the tape measure and note pad being illustrated in broken lines.

Turning now to FIGS. 5 and 6, there is generally indicated at 60 a note pad holder substantially similar to note pad holder 10 wherein corresponding parts are designated by corresponding reference numbers. More particularly, the note pad holder 60 has an elastic sleeve 62 identical to sleeve 38, and a rectangularly-shaped sheet of material 64 which is secured to the sleeve 62 on all four sides of the sheet by stitching 66. The sheet of material 64 has an elongate slit 68 formed therein that is sized for receiving the note pad 34. As shown, the slit 68 extends almost completely across the width of the sheet 64 to define a mouth 70 through which the note pad 34 is inserted. The note pad 34 is deposited within the space 72 (see FIG. 6) between the sheet 64 and the sleeve 62 wherein the sheet 64 secures the note pad 34 in place. Otherwise, the construction of the note pad holder 60 is identical to note pad holder 10.

Figure 7:
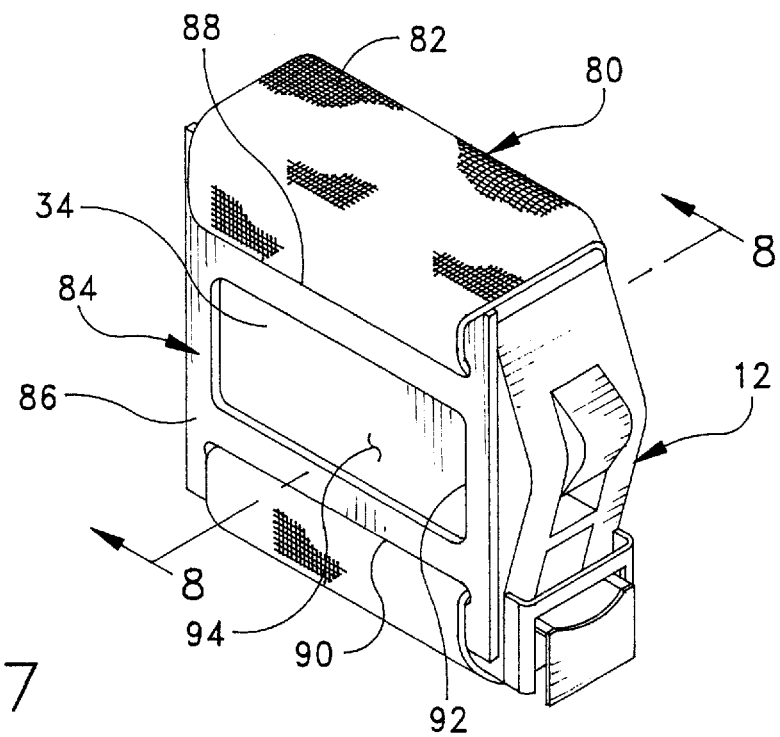
FIG. 7 is a perspective view of a note pad holder of yet another preferred embodiment secured to the tape measure.
Figure 8:
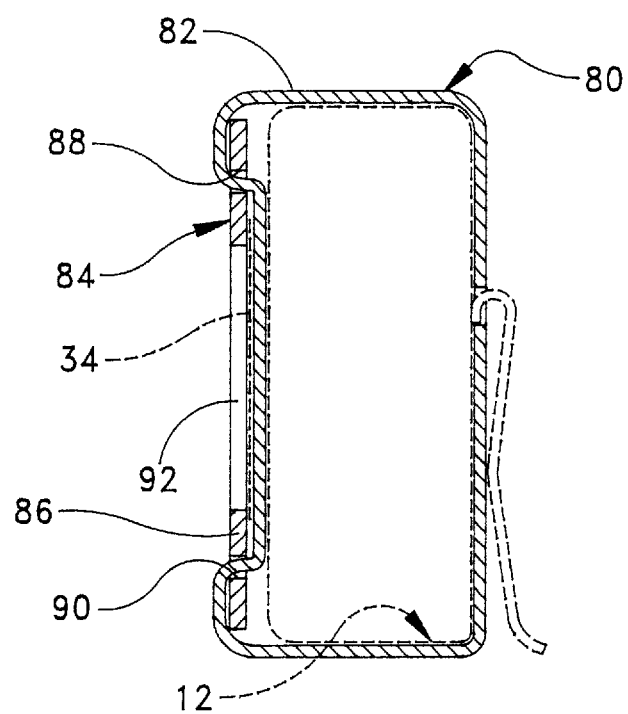
FIG. 8 is a cross-sectional view of the note pad holder illustrated in FIG. 7 taken along Line 8—8 thereof, the tape measure and note pad being illustrated in broken lines.

Referring to FIGS. 7 and 8, there is generally indicated at 80 note pad holder of yet another preferred embodiment. As shown, note pad holder 80 includes an elastic sleeve 82 and a rigid plate, generally indicated at 84, having a rectangularly-shaped body 86. As shown, the body 86 has a pair of elongate slots 88, 90 formed along opposite edges of the body 86 in such a manner that the slots 88, 90 are parallel to the opposite edges of the body 86.

The elastic sleeve 82 is woven through elongate slots 88, 90 of the body 86 of the plate 84 for securing the plate 84 to the sleeve 82. The note pad 34 is illustrated in broken lines in FIG. 8 and is positioned between the elastic sleeve 82 and the rigid plate 84. A large, centrally located opening 92 formed in the body 86 of the rigid plate 84 between the elongate slots 88, 90 exposes a writing surface 94 of the note pad 34 (FIG. 7). The force of the elastic sleeve 82 slipped over the housing 14 of the tape measure 12 and woven through the rigid plate 84 positively secures the note pad 34 between the sleeve 82 and the rigid plate 84.

Figure 9:
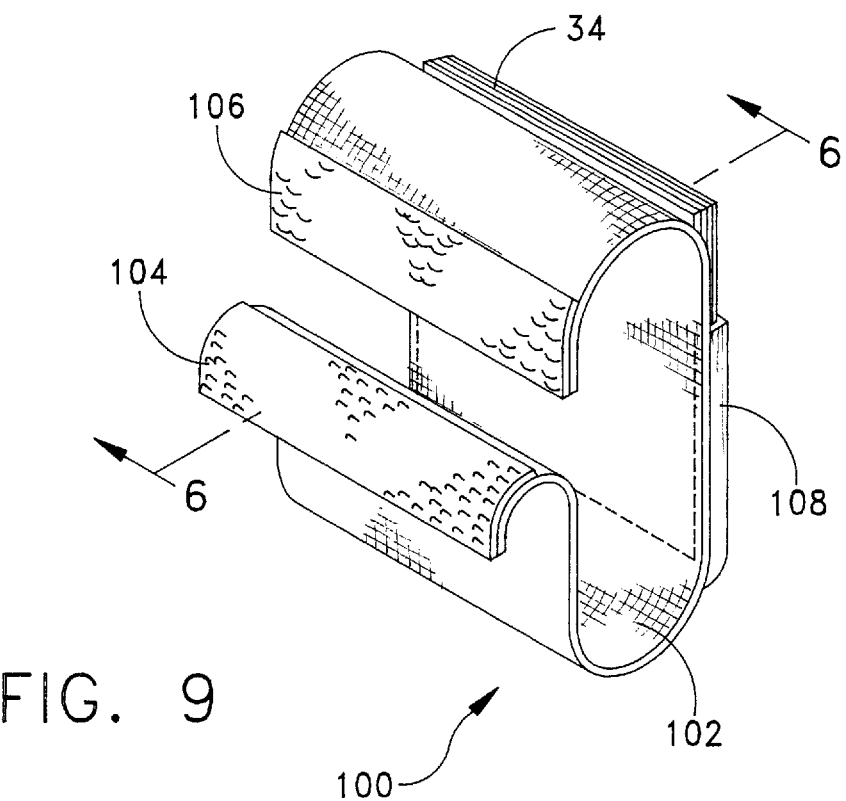
FIG. 9 is a perspective view of another note pad holder adapted to be releasably securable to a wearer's wrist.
Figure 10:
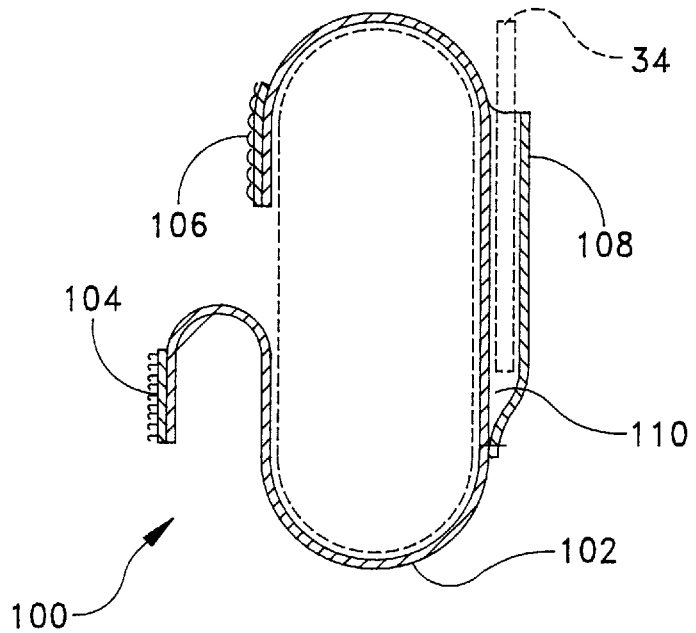
FIG. 10 is a cross-sectional view of the note pad holder illustrated in FIG. 9 taken along Line 10—10 thereof, the note pad being illustrated in broken lines.

Turning now to FIGS. 9 and 10, there is generally indicated at 100 a note pad holder of another preferred embodiment. Note pad holder 100 includes a flexible sleeve 102 which is not continuous. The sleeve 102 can be attached to a wearer's wrist by means of a pair of mating hook and loop material strips 104, 106 secured (e.g., by stitching) to opposite terminal edges of the sleeve. Thus, the sleeve 102 can be releasably attachable to the wearer's wrist upon engaging the strips 104, 106 to one another. also, the sleeve 102 can be removed by merely tearing the strips 104, 106 apart.

As most clearly shown in FIG. 10, a rectangularly-shaped sheet of material 108 is secured to the sleeve 102 much in the same manner as sheet 40 of note pad holder 10. Sheet 108 forms a packet 110 for receiving the note pad 34 therein.

Thus, it should be observed that the note pad holders 10, 60, and 80 of the present invention are effective for securing a note pad 34 to a tape measure 12 without negatively effecting the utility of the tape measure 12. The note pad holders 10, 60, and 80 each provide a simple and effective means of ensuring the note pad 34 is readily available when taking measurements with the tape measure 12. Note pad holder 100 is shown to be effective in securing a note pad 34 to a wrist. It can therefore be seen that the instant invention provides an advantage over the prior art. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A note pad holder for a tape measure comprising a box-shaped housing having a planar front wall, a planar back wall which is parallel to and spaced from the front wall, a top wall, a bottom wall, and a pair of end walls, said top, bottom and end walls being narrow in width with respect to the front and back walls, and a tape reel provided within the housing for dispensing tape through a horizontal aperture formed in one of the end walls, said note pad holder comprising:

a flexible sleeve sized to fit snugly over the front, back, top and bottom walls of the housing of the tape measure; and a pocket formed on the sleeve in a position in which it is adjacent one of the front and back walls, said pocket being sized for receiving therein a note pad.

2. The note pad holder as set forth in claim 1, said sleeve being fabricated from elastic fabric material which is stretched over the housing of the tape measure.

3. The note pad holder as set forth in claim 2, said pocket being fabricated from a rectangularly-shaped sheet of material attached on three sides thereof to the sleeve when the sleeve is in a relaxed condition, the non-attached side defining a mouth through which a note pad is deposited within said pocket.

4. The note pad holder as set forth in claim 3, said tape measure further comprising a clip fixedly secured to one of the front and back walls, said sleeve having an elongate slit formed therein for receiving the clip therethrough.

5. The note pad holder as set forth in claim 1, said pocket being fabricated from a rectangularly-shaped sheet of material attached on three sides thereof to the sleeve, the non-attached side defining a mouth through which a note pad is deposited within said pocket.

6. The note pad holder as set forth in claim 5, said tape measure further comprising a clip fixedly secured to one of the front and back walls, said sleeve having an elongate slit formed therein for receiving the clip therethrough.

7. The note pad holder as set forth in claim 1, said tape measure further comprising a clip fixedly secured to one of the front and back walls, said sleeve having an elongate slit formed therein for receiving the clip therethrough.

8. A note pad holder for a tape measure comprising a box-shaped housing having a planar front wall, a planar back wall which is parallel to and spaced from the front wall, a top wall, a bottom wall, and a pair of end walls, said top, bottom and end walls being narrow in width with respect to the front and back walls, and a tape reel provided within the housing for dispensing tape through a horizontal aperture formed in one of the end walls, said note pad holder comprising:

a flexible sleeve sized to fit snugly over the front, back, top and bottom walls of the housing of the tape measure; and holding means, formed on the sleeve, for receiving a note pad and securing the note pad to the sleeve in a position in which it is adjacent one of the front and back walls.

9. The note pad holder as set forth in claim 8, said sleeve being fabricated from elastic fabric material which is stretched over the housing of the tape measure.

10. The note pad holder as set forth in claim 8, said holding means comprising a pocket being sized for receiving therein a note pad.

11. The note pad holder as set forth in claim 10, said pocket being fabricated from a rectangularly-shaped sheet of material attached on three sides thereof to the sleeve, the non-attached side defining a mouth through which a note pad is deposited within said pocket.

12. The note pad holder as set forth in claim 11, said tape measure further comprising a clip fixedly secured to one of the front and back walls, said sleeve having an elongate slit formed therein for receiving the clip therethrough.

13. The note pad holder as set forth in claim 8, said holding means comprising a rectangularly-shaped sheet of material attached on all four sides thereof to the sleeve, said sheet of material having an elongate slit formed therein sized for receiving a note pad.

14. The note pad holder as set forth in claim 8, said holding means comprising a rigid plate including a rectangularly-shaped body having a pair of elongate slots formed along opposite edges of the body in such a manner that the slots are parallel to the opposite edges, said sleeve being woven through the elongate slots for securing the plate to the sleeve.

15. The note pad holder as set forth in claim 14, said body of the plate further having a large opening formed therein, the large opening being positioned between the elongate slots for exposing a writing surface of the note pad.

* * * * *